(12) United States Patent
Han et al.

(10) Patent No.: US 10,574,975 B1
(45) Date of Patent: Feb. 25, 2020

(54) METHOD AND APPARATUS FOR NAVIGATING THROUGH PANORAMIC CONTENT

(71) Applicant: AT&T Intellectual Property I, L.P., Atlanta, GA (US)

(72) Inventors: Bo Han, Bridgewater, NJ (US); Manuel Briand, Santa Monica, CA (US); Vijay Gopalakrishnan, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/058,199

(22) Filed: Aug. 8, 2018

(51) Int. Cl.
*H04N 13/349* (2018.01)
*H04N 5/445* (2011.01)
*H04N 5/44* (2011.01)

(52) U.S. Cl.
CPC ......... *H04N 13/349* (2018.05); *H04N 5/4403* (2013.01); *H04N 5/445* (2013.01)

(58) Field of Classification Search
None
See application file for complete search history.

(56) References Cited

U.S. PATENT DOCUMENTS

| | | | |
|---|---|---|---|
| 7,058,204 B2 | 6/2006 | Hildreth et al. | |
| 7,522,186 B2 | 4/2009 | Arpa et al. | |
| 7,750,936 B2 | 7/2010 | Provinsal et al. | |
| 8,063,936 B2 | 11/2011 | Samarasekera et al. | |
| 8,126,155 B2 | 2/2012 | Liu et al. | |
| 8,854,457 B2 | 10/2014 | De Vleeschouwer et al. | |
| 9,423,268 B2 | 8/2016 | Blumenberg et al. | |
| 9,467,750 B2 | 10/2016 | Banica et al. | |
| 9,486,174 B2 | 11/2016 | Choi | |
| 9,955,209 B2 | 4/2018 | Ng | |
| 9,959,905 B1 | 5/2018 | Sevigny | |
| 2010/0299630 A1 | 11/2010 | Mccutchen et al. | |
| 2012/0092348 A1 | 4/2012 | McCutchen et al. | |
| 2013/0325319 A1 | 12/2013 | Moore et al. | |
| 2015/0049162 A1 | 2/2015 | Kurupacheril et al. | |
| 2016/0320951 A1 | 11/2016 | Ernst et al. | |
| 2017/0026577 A1* | 1/2017 | You | G06F 3/167 |
| 2017/0103535 A1 | 4/2017 | Mathsyendranath et al. | |
| 2017/0139578 A1 | 5/2017 | Dickerson et al. | |

(Continued)

FOREIGN PATENT DOCUMENTS

WO  2014094537 A1  6/2014
WO  2017060423 A1  4/2017

OTHER PUBLICATIONS

Beddoe-Stephens, Paul, "New Publisher Tools for 360 Video", https://media.fb.com/2016/08/10/new-publisher-tools-for-360-video/, Aug. 10, 2016, 4 pages.

(Continued)

*Primary Examiner* — Samira Monshi
(74) *Attorney, Agent, or Firm* — Guntin & Gust, PLC; Mark Wilinski

(57) ABSTRACT

Aspects of the subject disclosure may include, for example, receiving content that includes a 360-degree video, determining that guidance is enabled with respect to the content, obtaining an input responsive to determining that the guidance is enabled, and obtaining the guidance with respect to a playback of the content, where the obtained guidance is based on the input. Other embodiments are disclosed.

20 Claims, 15 Drawing Sheets

(56) References Cited

U.S. PATENT DOCUMENTS

2018/0007262 A1 1/2018 Rantala et al.
2018/0024724 A1 1/2018 Patel et al.
2018/0115706 A1 4/2018 Kang et al.
2018/0367777 A1* 12/2018 Li .......................... G06T 7/285

OTHER PUBLICATIONS

Benjamin, Freddie, "Mobile vs Desktop Video: How do they compare?", https://www.linkedin.com/pulse/mobile-vs-desktop-video-how-do-compare-freddie-benjamin, Aug. 20, 2015, 3 pages.
Han, Bo et al., "Method of Field of View Prediction for 360 Video Streaming", U.S. Appl. No. 15/828,994, filed Dec. 1, 2017, 75 pages.
Kuzyakov, Evgeny et al., "Under the hood: Building 360 video", https://code.facebook.com/posts/1638767863078802/under-the-hood-building-360-video/, Oct. 15, 2015, 7 pages.
Zhou, Chao et al., "A Measurement Study of Oculus 360 Degree Video Streaming", Proceedings of MMSys 2017, Taipei, Taiwan, Jun. 20-23, 2017, 11 pages.
Boonsuk, Wutthigrai et al., "The Impact of Three Interfaces for 360-Degree Video on Spatial Cognition", Proceedings of the SIGCHI conference on human factors in computing systems, ACM, 2012., 2012, 11 pages.
Corbillon, Xavier et al., "Viewport-Adaptive Navigable 360-Degree Video Delivery", Communications (ICC), 2017 IEEE International Conference, IEEE, 2017., May 10, 2017, 7 pages.
Niamut, Omar A. et al., "Towards a Format-agnostic Approach for Production, Delivery and Rendering of Immersive Media", Proceedings of the 4th ACM Multimedia Systems Conference, ACM, 2013., Feb. 2013, 13 pages.
Seo, Dongmahn et al., "Real-time panoramic video streaming system with overlaid interface concept for social media", Multimedia systems 20.6 (2014): 707-719., Aug. 17, 2012, 13 pages.

* cited by examiner

METHOD AND APPARATUS FOR NAVIGATING THROUGH PANORAMIC CONTENT

FIELD OF THE DISCLOSURE

The subject disclosure relates to a non-interruptive viewport navigation of a 360-degree video.

BACKGROUND 360-degree videos can provide users/viewers with a unique, immersive experience that is otherwise unavailable with more conventional, non-360 degree videos. However, the freedom of being able to watch in 360-degrees may make a user feel lost, simply because the user does not know in which direction she should move her eyes. Moreover, the user can be concerned with missing a key moment (e.g., a moment that occurs opposite to a current viewing direction). In many instances, a lack of guidance in viewing the video leads to a suboptimal or even unacceptable viewing experience.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for providing and presenting a non-interruptive and user-friendly interface to navigate and guide viewers to objects or scenes that they may potentially be interested in when watching 360-degree videos. Other embodiments are described in the subject disclosure.

One or more aspects of the subject disclosure include a flexible, non-interruptive user interface to help a user/viewer select a future Field of View (FoV) at one or more levels.

One or more aspects of the subject disclosure include an overlay of one or more icons on a video. A first icon (or first grouping of icons) may represent a selectable camera to enable a user to switch between content captured by one or more of a plurality of cameras. A second icon (or second grouping of icons) may represent a selectable region of interest (ROI)/point of interest (POI), where the ROI may be identified using one or more techniques.

One or more aspects of the subject disclosure include an overlay of information-centric navigation capabilities in a 360-degree video. In some embodiments, the navigation capability may be represents using picture-in-picture and/or text hints/prompts.

The predominance of video streaming in today's Internet shows no sign of weakening. Mobile videos are escalating in terms of many dimensions/parameters, including resolution, frame rate, codec, and in particular, interaction (e.g., 360-degree video and drone-assisted video). Such changes are fueled by multiple factors including faster mobile networks (LTE and 5G), new video types, more powerful devices, and affordable gear such as Virtual Reality (VR) headsets.

360-degree videos, also known as immersive or panoramic videos, are rapidly becoming the "next frontier" in mobile video. As a significant component of VR, they provide users with an immersive viewing experience that far exceeds what more traditional/conventional videos can offer.

Figure 1:
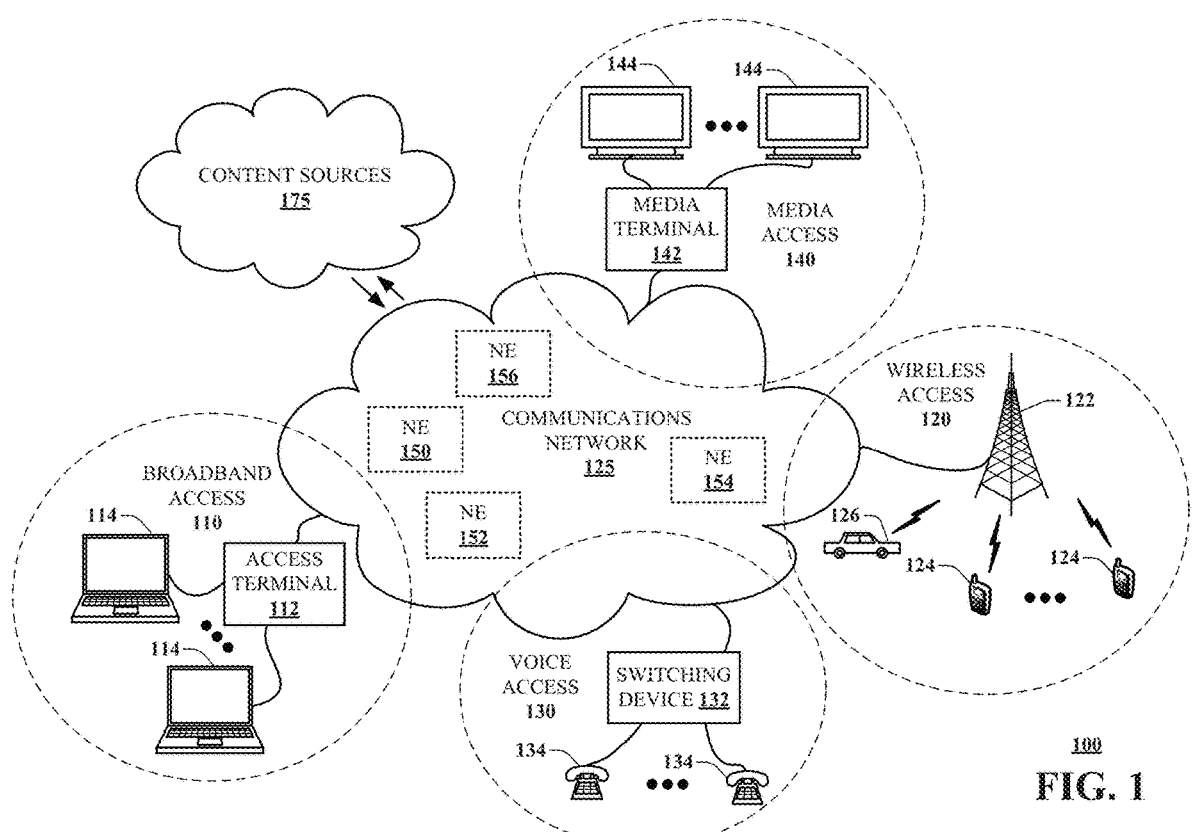
FIG. 1 is a block diagram illustrating an example, non-limiting embodiment of a communications network in accordance with various aspects described herein.

Referring now to FIG. 1, a block diagram is shown illustrating an example, non-limiting embodiment of a communications network 100 in accordance with various aspects described herein. The communications network 100 may be used to provide a non-interruptive navigation control for one or more panoramic videos, such as for example a 360-degree video. Aspects of the communications network 100 may provide for such navigation control in conjunction with a transmission (e.g., a streaming) of the videos.

Referring back to FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
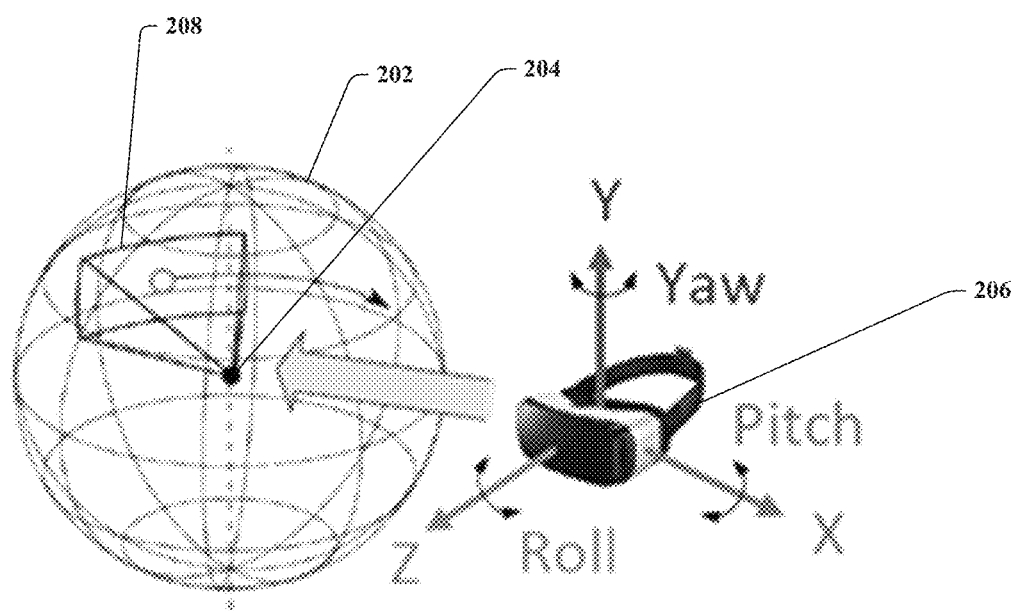
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In particular, and as described above, aspects of the disclosure may be applied in conjunction with 360-degree videos. 360-degree videos may be recorded by omnidirectional cameras or camera array systems, and then "wrapped" onto a three-dimensional (3D) sphere (e.g., 3D sphere 202), with the cameras at or proximate a center 204 of the sphere. When watching a 360-degree video, a user/viewer at the spherical center 204 can freely control her viewing direction, so each playback may create a unique viewing experience. The control of viewing directions may be achieved through, e.g., head movement when using a head-mounted device, hand/finger movement when using a mobile/portable communication device (e.g., a phone or a tablet), and a mouse click when using a laptop or desktop computer. Other techniques, such as for example gesture recognition, may be used.

As shown in FIG. 2A, a virtual reality (VR) headset 206 can be used to adjust a viewing orientation by changing the pitch, yaw, and/or roll, which correspond to movement (e.g., rotation) along the super-imposed X, Y, and Z axes, respectively. The headset 206 may support operations in accordance with six degrees/dimensions of freedom. For example, the X, Y, and Z axes collectively represent three dimensions of freedom, and movement along any one of the axes (e.g., in a plus or minus direction) represents another degree/dimension of freedom.

360-degree video players may compute and display the viewing area based on the orientation and the field of view (FoV). The FoV defines the extent of an observable area 208, which may be a fixed or dynamic parameter of the VR headset 206. In an illustrative embodiment, the observable area 208 may be 110° horizontally (+/−10%) and 90° vertically (+/−10%). Other values of the observable area 208 may be used in some embodiments.

A number of projection schemes may be used for creating/generating 360-degree videos. As used herein, a projection is a transformation of the locations from the surface of a sphere (e.g., sphere 202) into locations on a plane (where the plane may substantially correspond to the observable area 208). As one skilled in the art would appreciate, two popular/common projection techniques are equirectangular and cube map.

In terms of 360-degree video streaming, a simple technique that may be used is to deliver all panoramic views to a user equipment/client device, even if the user equipment is not oriented to consume/present a particular view. Such a technique simplifies the determinations that need to be made by, e.g., a content delivery server. However, this technique of delivering all the video content/panoramic views is not especially network friendly (e.g., may lead to unnecessary network congestion or bandwidth utilization), as a user likely will watch only a fraction of the transmitted video. For more advanced schemes/techniques that perform viewport adaptation, the schemes can generally be divided into two categories: (1) a tile based scheme, and (2) a version based scheme.

In a tile based scheme, a 360-degree video may be spatially segmented into tiles. Tiles that are within the FoV may be transmitted (at a relative high degree of quality), whereas tiles that are outside of the FoV are either not transmitted or are transmitted at a lower degree of quality.

In a version based scheme, a 360-degree video may be encoded into multiple versions, with each version including a different high-quality region. A user equipment may select an appropriate version for receipt (e.g., download) based on a user's viewing direction/FoV. One practical drawback of the version based scheme is that it may incur significant overhead at, e.g., a server or database due to the maintenance (e.g., storage) of the different versions of the video.

As described above, while 360-degree videos offer users a unique and immersive viewing experience, users may have a tendency to feel confused or lost because they do not know in which direction to move their eyes. For example, a user may feel apprehension or concern about missing a significant moment in a video, such as for example an event occurring in a viewing direction that is approximately 180-degrees behind/removed from a current viewing direction.

Figure 2B:
FIGS. 2B-2C depict illustrative embodiments of a first scene and a second scene, respectively, of a video in accordance with various aspects described herein.
Figure 2C:

Aspects of the disclosure may be used to guide a user's attention to particular objects, regions, or scenes of interest in a video. For example, referring to FIG. 2B and FIG. 2C, respective scenes 212 and 222 associated with a video are depicted. Collectively, the scenes 212 and 222 depict, e.g., a woman 214, a first man 216, and a second man 226 that are present in a common location (e.g., a kitchen of a house). For purposes of this example, it may be assumed that the scene 222 occurs shortly after the scene 212 occurs in terms of a normal/conventional playback of the video (e.g., a playback of the video in a forward direction at normal/typical speed). It may further be assumed that the scenes 212 and 222 are projected onto a 3D sphere (e.g., sphere 202 of FIG. 2A), with the scene 212 and the scene 222 separated from one another by approximately 180-degrees relative to a center of the sphere (e.g., center 204 of FIG. 2A).

As part of the scene 212, the woman 214 may present the first man 216 with a gift, such as for example a watch 218. As shown in the scene 212, the woman 214 and the first man 216 may share an embrace as part of the presentation of the watch 218. The second man 226, who upon viewing the exchange between the woman 214 and the first may 216 may be upset that he was not the recipient of the watch 218, may abruptly turn and leave the common location by exiting via a door 224.

In order to encourage a user to view the scenes 212 and 222 at their respective moments of occurrence (e.g., the embrace associated with the gifting of the watch 218; the second man 226 exiting via the door 224), a person/party responsible for the creation, distribution, or dissemination of the video may flag/tag the scenes 212 and 222 as a region of interest (ROI). Still further, particular objects (e.g., the watch 218, the door 224, etc.) within a given scene may be flagged/tagged to provide particular focus. The tagging may be based on an addition/supplement of metadata to the video. When the video is played back (which can include conventional playback at normal speed or abnormal speed [e.g., fast forward, reverse, etc.], or a trick-play video), the playback may automatically pan to those scenes/objects identified as a ROI, such that the ROI is presented (e.g., centered) in the FoV. In some embodiments, a device (e.g., a user equipment) may provide a user an ability to override/disable the identified ROI, thereby allowing the user to view scenes/objects of her own choosing.

While an application of a tag to selected portions of a video as described above may assist a user in terms of automatically guiding the user to a particular potential ROI, such tagging may shift the challenge of directing a user's attention to, e.g., a video creator, distributor, or disseminator. For example, a user might not be interested in the scenes or objects that the party applying the tag considered to coincide with a ROI. As such, a tagging of videos may have a tendency to frustrate a user in terms of the overall viewing experience.

Figure 2D:
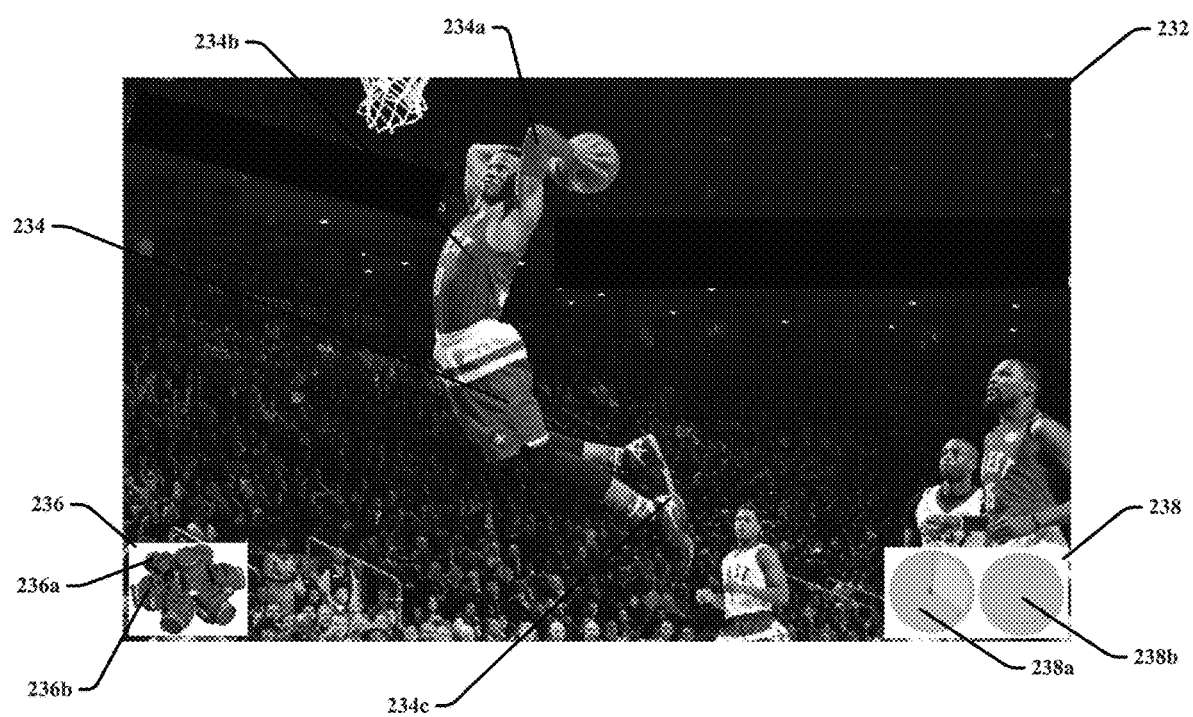
FIG. 2D depicts an illustrative embodiment of a scene of a video incorporating objects and icons in accordance with various aspects described herein.

In order to provide greater flexibility in terms of a user selection of a potential ROI or preferred FoV, aspects of the disclosure may provide user interfaces at a camera and/or viewport level that enable greater user control over the portions of media/content that is consumed/viewed. For example, FIG. 2D illustrates a scene 232 associated with a basketball game, where a player 234 involved in the basketball game is driving towards the basket/goal to execute a move that is commonly referred to in the art as a slam dunk. The scene 232 may be overlaid with one or more icons (or groups of icons) as described further below.

A first group of icons 236 may present a plurality of different selectable cameras, such as for example a first camera 236a and a second camera 236b. Each of the cameras included as part of the first icon 236 may be associated with a capture (e.g., a recording) of the scene 232 from a different perspective. For example, selection of the first camera 236a may depict/emphasize a (compression) sleeve 234a that is worn on the player 234's left forearm. Selection of a different camera, such as for example the second camera 236b, may tend to emphasize a name printed on the back of the player's shirt/jersey 234b; such a view/perspective can aid a user in identifying or distinguishing the player 234 from all of the other players on the basketball court.

While described above in the context of cameras (e.g., cameras 236a and 236b), other types of equipment may be selected in conjunction with the first icon 236. For example, in some embodiments one or more of a plurality of different microphones that capture (e.g., record) audio may be selected.

The views captured by/associated with the first camera 236a and the second camera 236b may be used as part of a marketing campaign/effort to promote or sell merchandise, such as for example the sleeve 234a or the jersey 234b associated with the player 234. In some embodiments, a user may be able to select, e.g., the sleeve 234a or the jersey 234b on a user equipment. In some embodiments, a highlighting or shading applied to the sleeve 234a or the jersey 234b may signify to a user that the item is selectable. The sleeve 234 or the jersey 234b may be selectable via metadata embedded in the video. A selection of the sleeve 234 or the jersey 234b may cause, e.g., an application or website to launch on the user equipment (or another device) to provide more information about the selected item and/or to provide an ability to order the selected item. In some embodiments, a link to the website may be provided.

Whether a particular item (e.g., the sleeve 234a, the jersey 234b) is selectable may be a function of a user profile. The user profile may include a specification of a user account with a social media service/platform, a history/log of a user's past product/service purchases or media consumed, etc. For example, if a user's contacts (e.g., friends) on a social media platform have indicated an interest in basketball, an assumption may be made that the user may also be interested in basketball. As such, the sleeve 234a and/or the jersey 234b may be selectable on the basis of that assumption.

Similarly, if the user posted commentary on the social media platform with keywords 'basketball' and 'awesome' (or the like), in combination with the player 234's surname, then an assumption may be made that the user is interested in basketball (or the specific player 234). In this regard, the sleeve 234a and/or the jersey 234b may be selectable on the basis of that assumption.

If the user purchased a prior version/release of the sleeve 234a or the jersey 234b, the sleeve 234a and/or the jersey 234b may be selectable as part of a new version/release of the sleeve 234a or the jersey 234b (e.g., the sleeve 234a or the jersey 234b depicted in the scene 232 may have enhanced features, such an increased ability to wick-away moisture/sweat from the player 234 relative to the version of the product that the user previously purchased). Similarly, if the user purchased another item (e.g., an instance of the sneakers 234c depicted in FIG. 2D) in the past, then an assumption may be made that the user may be interested in other products worn or endorsed by the player 234.

In some embodiments, a determination may be made whether a particular item/object is selectable based on a location of a user. For example, the sneakers 234c may be identified as a selectable item if the user's current location (which may be identified on the basis of one or more techniques, such as for example triangulation, GPS coordinates, IP address association with a router, gateway, or base station/access point, etc.) is within a threshold distance of a retailer that has a pair of the sneakers 234*c* in the user's size (where the user's size may be obtained from the user profile described above) in current inventory (where a state of the retailer's current inventory may be accessible via a website or database associated with the retailer). Conversely, if the user is distant from the retailer or the retailer lacks the user's current size in inventory, the user may be provided a link that is directed to a website to place an order for the sneakers online.

In some embodiments, a time of day or day of week may serve as a condition as to whether a particular item is selectable. Continuing the above example, if the retailer dealing in the sneakers 234*c* has regular operating hours between 9 AM to 6 PM Monday through Friday (and is closed at all other days and times), the sneakers 234*c* may be selectable if the user is viewing the scene 232 between 8:30 AM and 5:00 PM on Monday through Friday (which assumes that, as an estimate, that it would take the user approximately a half an hour to arrive at the retailer; the estimate may be based on current or forecasted traffic conditions associated with the roadway/path to get from the user's current location to the retailer [the traffic conditions may be based on a local news website or the like]; the estimate may also assume that the user may want to spend approximately half an hour trying on the sneakers before purchasing them). Conversely, if the user is viewing the scene 232 outside of the hours of 8:30 AM and 5:00 PM on Monday through Friday, the sneakers 234*c* might not be a selectable item/object or a selection of the sneakers 234*c* may be directed to the website associated with the retailer.

In some embodiments, a user's calendar may be consulted to determine a user's anticipated location on a future date/time. For example, if the user is traveling to Oklahoma City, Okla. in two weeks and the player 234 is based in Oklahoma and autographing pairs of the sneakers 234*c* for purchase, an advertisement/promotion associated with the autograph signing may be provided to the user in conjunction with a selection of the sneakers 234*c*.

Referring back to FIG. 2D, a second group of icons 238 overlaid on the scene 232 may provide (supplemental) information in conjunction with a viewport level/context. For example, the information may provide an indication of a current FoV, a potential ROI, and an explanation/description or other indication of what is depicted in the current FoV or the potential ROI.

The second group of icons 238 may include a first icon 238*a* and a second icon 238*b*. The first icon 238*a* may provide information in relation to, or from the perspective of, a horizontal surface of a sphere (e.g., sphere 202 of FIG. 2A). The second icon 238*b* may provide information in relation to, or from the perspective of, a vertical surface of the sphere. The icons 238*a* and 238*b* are described further below in connection with FIGS. 2E-2F.

Figure 2E:
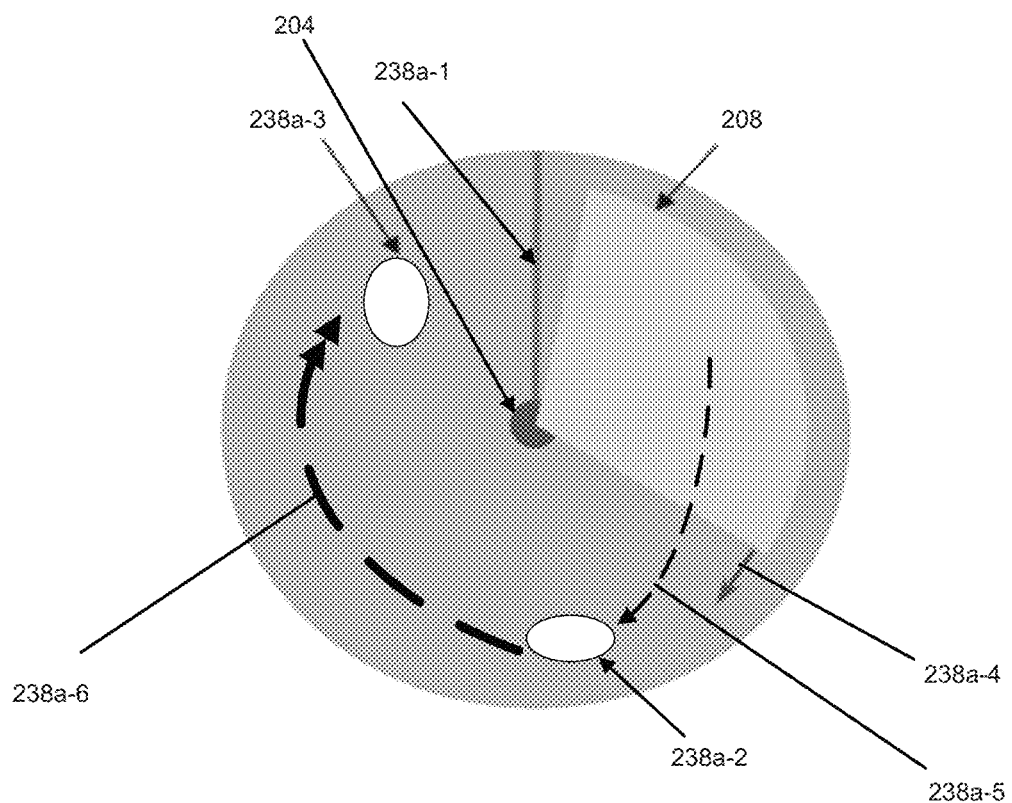
FIGS. 2E-2F depict illustrative embodiments of icons in accordance with various aspects described herein.

As shown in FIG. 2E, the first icon 238*a* may depict the FoV/observable area 208 relative to: (1) an initial or reference viewing direction coinciding with a marker 238*a*-1, and (2) the center 204. Also depicted as part of the first icon 238*a* may be a representation of a first potential region or object of interest 238*a*-2 and a second potential region or object of interest 238*a*-3. Relative to, e.g., the marker 238*a*-1, a respective longitudinal location of each of the potential regions/objects of interest 238*a*-2 and 238*a*-3 is provided based on what is shown in FIG. 2E.

Also shown in FIG. 2E is an arrow 238*a*-4. The arrow 238*a*-4 may provide a user with an indication of a current direction of navigation and/or a current speed of navigation. For example, the arrowhead associated with the arrow 238*a*-4 may indicate that the user is moving in a clockwise direction in FIG. 2E. A size or magnitude of the arrowhead of the arrow 238*a*-4 may provide an indication of the speed (e.g., a larger arrowhead may indicate a faster speed relative to a smaller arrowhead). In some embodiments, a color-coding scheme may be use. For example, green used in conjunction with the arrowhead of the arrow 238*a*-4 may indicate a faster speed relative to yellow, yellow may indicate a faster speed than red, etc.

In some embodiments, the icon 238*a* may include an arrow 238*a*-5 and/or an arrow 238*a*-6. As illustratively represented by the dashed nature of the arrows 238*a*-5 and 238*a*-6, the arrows 238*a*-5 and 238*a*-6 may be used to guide the user to the objects/regions of interest 238*a*-2 and 238-3 during a playback of the associated video. For example, and assuming that the user's current FoV/observable area 208 coincides with what is shown in FIG. 2E, the arrow 238*a*-5 may guide/direct the user from the (center of the) current FoV 208 to the object/region 238*a*-2. Similarly, the arrow 238*a*-6 may guide the user from the object/region 238*a*-2 to the object/region 238*a*-3.

Graphical characteristics associated with the arrows 238*a*-5 and 238*a*-6 may provide a user with an indication as to direction and speed to arrive at an object or region of interest. For example, the arrows 238*a*-5 and 238*a*-6 indicate that the user should turn in the clockwise direction to arrive at the object/region 238*a*-2 and the object/region 238*a*-3, respectively. A size/typeface associated with the arrows 238*a*-5 and 238-6 may represent a recommendation regarding a speed at which to rotate. For example, the smaller size of the arrow 238*a*-5 (relative to the arrow 238*a*-6) may indicate that the user should rotate relatively slowly to arrive at the object/region 238*a*-2. Conversely, the larger size of the arrow 238-6 (relative to the arrow 238*a*-5) may indicate that the user should rotate relatively rapidly to arrive at the object/region 238*a*-3.

In some embodiments, a count of arrowheads included with an arrow may serve as indication of a recommended speed. For example, the arrow 238*a*-6 is shown in FIG. 2E as including two/dual arrowheads proximate the object/region 238*a*-3, which may indicate a faster recommended speed relative to the single arrowhead shown in conjunction with the arrow 238*a*-5.

Other techniques for indicating, e.g., a recommended speed may be used. For example, a color-coding scheme similar to the one described above may be used.

The recommendations associated with the arrows 238*a*-5 and 238*a*-6 may be provided as static information. Alternatively, the recommendations may be updated dynamically in response to user/user equipment conditions. For example, if it is determined that during the playback of the video that the user is moving (e.g., rotating) too slowly from the object/region 238*a*-2 to the object/region 238*a*-3, such that the user may miss an important scene associated with the object/region 238*a*-3, the arrow 238*a*-6 may, e.g., become larger in size, have additional arrowheads superimposed on an end, change in color, etc., to encourage the user to rotate more rapidly. In this respect, the user's current viewing direction, the rate of change in the viewing direction, and the size of the FoV/observable area 208 may be monitored/analyzed to enhance the user's viewing experience by ensuring that a user does not miss, e.g., important scenes associated with a video.

Similarly, if the user veers off the recommended course at a particular point in time during the playback of the video, the user may be re-routed using updated/modified guidance. For example, if instead of traveling in the clockwise direction (in conjunction with the arrow 238a-5) to arrive at the object/region 238a-2 the user opted to turn in the counter-clockwise direction and arrived at, e.g., the marker 238a-1 at the time the user was recommended to arrive at the object/region 238a-2, the arrow 238a-6 may be redrawn/reoriented such that the user may be recommended to continue to travel in the counter-clockwise direction to arrive at the object/region 238a-3.

An identification of probable objects/regions of interest in a video may be based on what a user has viewed to a current point in a playback of the video. For example, and recognizing that no two users' interests will be exactly identical, if the user spends more than a threshold amount of time observing one or more scenes associated with the region 238a-2, then the recommendation associated with the guide/arrow 238a-6 to the object/region 238a-3 may be deleted/discarded (potentially in favor of another guide/arrow not shown), particularly if the object/region 238a-3 is generally unrelated to the object/region 238a-2.

While the recommendations associated with the arrows 238a-5 and 238a-6 are described above in terms of graphical characteristics (e.g., direction, size, count of arrowheads, colors, etc.), aspects of the disclosure may include audio cues/recommendations that may be selectively enabled to assist a user in viewing a video. For example, if enabled an audio cue may instruct a user to "turn to your right at a rate of 15 degrees per second to see the next object or region of interest". Such audio cues may also provide feedback to a user to enable the user to "arrive" at an object/scene of interest at an appropriate time in the playback of the video; for example "you are turning too fast, slow down". Another audio cue, e.g., "you are turning in the wrong direction, turn the other way" may assist a user in turning in the right/proper direction.

In some embodiments, a user equipment may include a microphone that may enable the user to obtain guidance to objects/regions of interest based on a query/input provided by the user. For example, if a scene associated with the region 238a-2 depicts a technician repairing an automobile, the user may ask if there's any other regions or scenes in the video of a technician repairing an aircraft; e.g., the user may speak into the microphone words to the effect: "this automobile repair interests me; are there any scenes of aircraft repair?" In response to the query, the video may be, e.g., fast-forwarded to a scene involving a repair of an aircraft and the user may be guided to a region (e.g., the region 238a-3, in an example) associated with the same. Alternatively, the user may simply speak into the microphone "this automobile repair interests me" and the video may be fast-forwarded to the scene of the aircraft repair on the basis of an assumption that, in view of the user's expressed interest in automobile repair that any vehicular repair may be of probable interest to the user. Still further, if the user spends more than a threshold amount of time viewing the automobile repair, it may be inferred that any vehicular repair may be of probable interest to the user. In some embodiments, gaze tracking technology may be used to infer a user's interest (or lack of interest) in a particular subject matter.

Figure 2F:
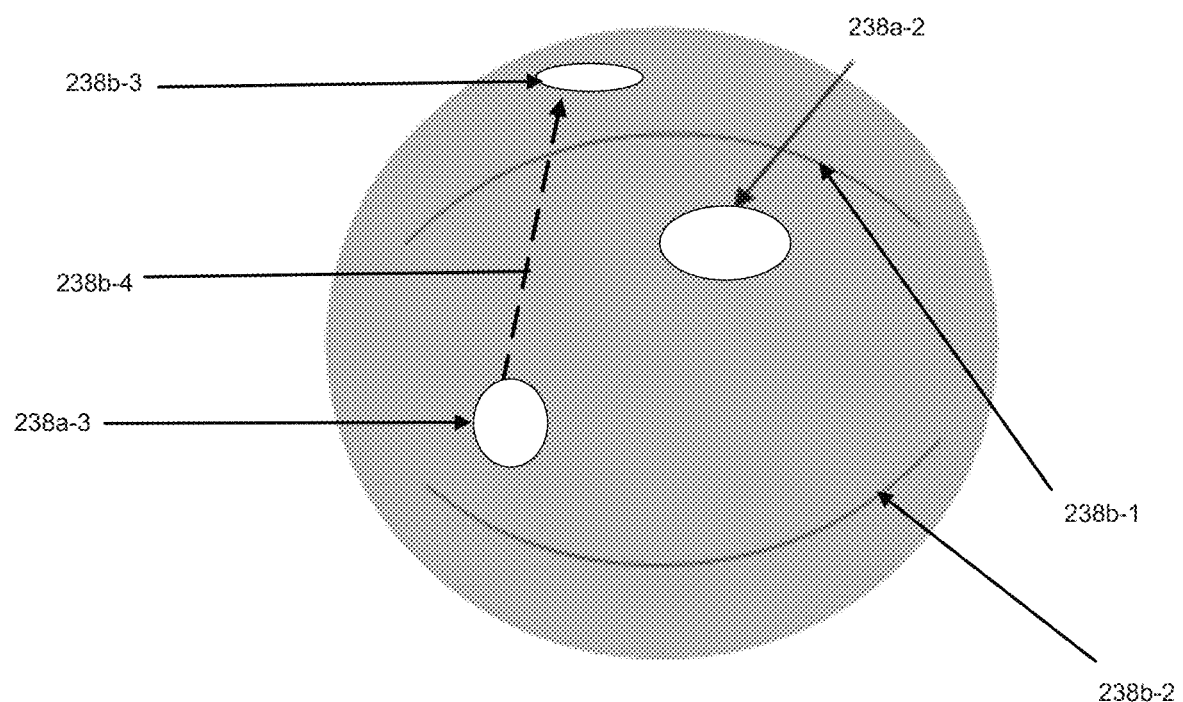

As shown in FIG. 2F (see also FIGS. 2D-2E), the second icon 238b may include the objects/regions 238a-2 and 238a-3. The icon 238b may also include markers, such as an upper marker 238b-1 and a lower marker 238b-2. The markers 238b-1 and 238b-2 may represent upper and lower bounds, respectively, of the current observable area/FoV 208 (see also FIG. 2A and FIG. 2E). In this respect, as shown in FIG. 2F the objects/regions 238a-2 and 238a-3 are within the bounds of the FoV 208. Conversely, a different object/region 238b-3 is shown as being located outside of/above the upper marker 238b-1. In this respect, a user may need to adjust/modify her current viewing perspective in order to view/perceive the object/region 238b-3. For example, the user may need to look upwards to view the object/region 238b-3, thereby traversing the upper bound/marker 238b-1 associated with the current FoV. Analogously, a navigation path may traverse the lower bound/marker 238b-2 in order to enable a user to view, e.g., objects that are below the lower bound/marker 238b-2.

Similar to the description above in connection with FIG. 2E, a user may be provided guidance/recommendations in connection with viewing objects/regions in the vertical direction in conjunction with FIG. 2F. For example, if in viewing a playback of a video a user is recommended to view object/region 238b-3 subsequent to viewing object/region 238a-3, an arrow 238b-4 may provide the user with guidance as to a direction, a path, and/or a speed in order to "arrive" at the object/region 238b-3 (from the object/region 238a-3) at an appropriate point in time during the playback. Audio cues/recommendations, which may be selectively overlaid in conjunction with any audio that may be present as part of the playback of the video, may be included.

Figure 2G:
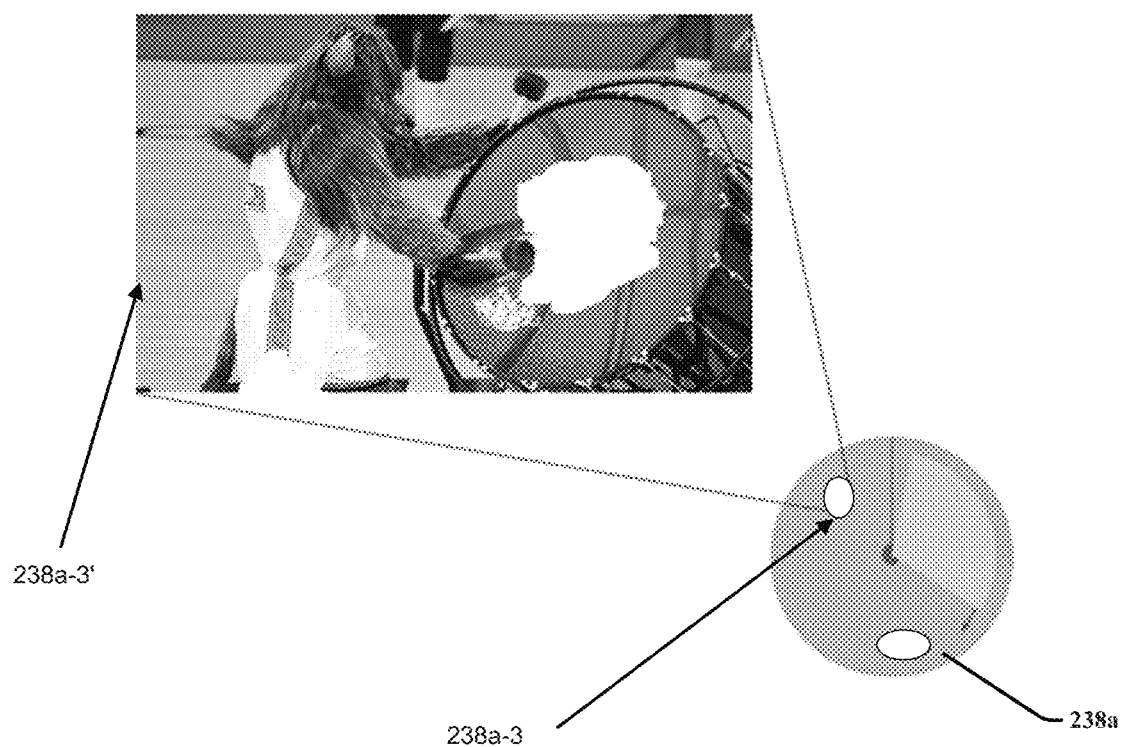
FIG. 2G depicts a preview trailer associated with an object or region of potential interest in accordance with various aspects described herein.

A user may have an ability to obtain a preview of an object/region of potential/probable interest. For example, as shown in FIG. 2G, a user may select the object/region 238a-3. Such selection may be made in any number of ways, including for example a mouse click, a finger depression of a soft-button, a gaze command, a voice command, etc. A preview/trailer video 238a-3' may be presented responsive to the selection. In this illustrative example, the preview/trailer video 238a-3' pertains to a mascot playing a drum as part of, e.g., halftime or intermission entertainment. The user may have an ability to provide feedback, e.g., to confirm interest in the portion of the video coinciding with the trailer 238a-3' or to indicate a lack of interest in the same. Such feedback may be provided in any number of ways, such as for example a mouse click, a finger depression of a soft-button, a gaze command, a voice command, etc. In accordance with the above, recommended/guided navigation instructions may be confirmed or altered based on the feedback provided by the user.

In terms of predicting objects/regions of interest, such predictions may be based on one or more factors/conditions. For example, in some embodiments user feedback may be obtained to determine relative interest levels. For example, if a majority of users tend to gravitate to a particular scene in a video, that scene (and potentially one or more objects depicted therein) may be tagged as being relevant to a large number of users and recommended for future user viewing.

In some embodiments, objects/regions of probable interest may be based on one or more of video content analysis, spatial audio analysis, user profiling, etc. For example, in the context of a video depicting a soccer game, a soccer ball, a subset of the soccer players, and a referee may represent objects of probable interest to a user/viewer. When watching the soccer game, the user will likely follow the movement of the ball, the players, and the referee (while largely disregarding movements or reactions that may be present in audience seating areas).

As described above, spatial audio analysis may be applied in some embodiments. A challenge imposed in connection with such an analysis is to locate a source of sound that is interesting (or likely to be interesting) to a user. There may be a number of paradigms associated with an audio signal, such as for example a channel-based paradigm, an object-based paradigm, and a scene-based paradigm. In conjunction with a channel-based paradigm, audio signals may be included as part of a network of existing channels in order to leverage resources associated with those existing channels. In connection with an object-based paradigm, a position of an audio (source) object may be described as part of metadata co-existing with audio content/data. As part of a scene-based paradigm, audio may be incorporated as part of one or more scenes, potentially in conjunction with one or more observable areas. In some embodiments, audio signaling may adhere to an ambisonic formatting.

Figure 2H:
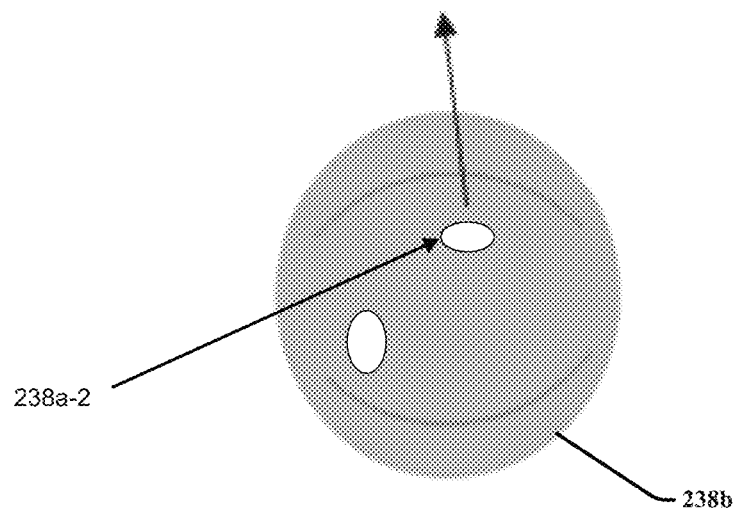
FIG. 2H depicts a textual transcript of a preview audio clip associated with an object or region of potential interest in accordance with various aspects described herein.

Referring to FIG. 2H (see also FIG. 2D and FIG. 2F), the icon 238b is shown, wherein a user has selected the object/region 238a-2 potentially as part of a preview option (e.g., to confirm whether the user is interested in the video associated with the object/region 238a-2). As part of that selection, if the object/region 238a-2 is associated with a basketball game an audio clip/preview may play. For example, responsive to the selection audio associated with an announcer or commentator stating that there's a "conflict between players A and B" may be provided. The preview audio may be operative/play based at least in part on an audio analysis as described above.

Figure 2I:
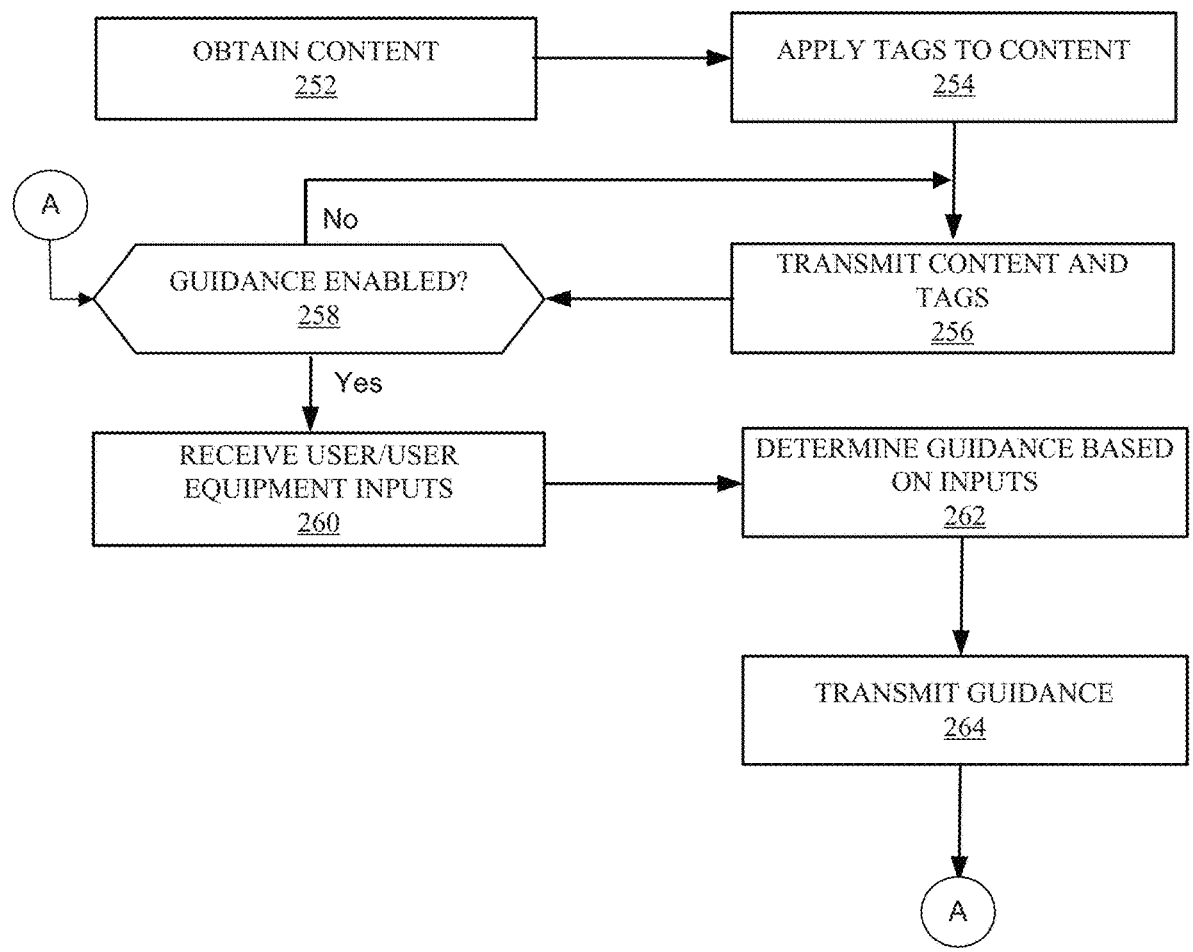
FIGS. 2I-2J depict illustrative embodiments of methods in accordance with various aspects described herein.

FIG. 2I depicts an illustrative embodiment of a method 250 in accordance with various aspects described herein. The method 250 may be used to provide content/media (e.g., 360-degree videos) to a user/user equipment and may provide guidance information or direction to a user in terms of a consumption (e.g., a viewing) of such content.

In block 252, content/media may be obtained. For example, in the context of a content disseminator/distributor, the content disseminator may receive the content from one or more content originators. The content may be at least partially generated by the content disseminator as part of block 252. For example, the content disseminator may supplement first content received from the content originators with second content generated by the content disseminator.

In block 254, one or more tags may be applied to the content obtained in block 252. For example, scenes, object, or regions of potential interest to a user may be tagged in the content of block 252. Video, audio, and/or image analysis techniques may be applied to tag the content in block 254. The tags may be applied on the basis of one or more factors or conditions, such as for example those described above (e.g., user profile, current or future expected location of a user, availability of merchandise or services, etc.).

In some embodiments, the tags applied as part of block 254 may be based on the use of metadata. The metadata may be embedded as part of the content.

In some embodiments, the tags applied as part of block 254 may include an indication of one or more cameras (e.g., camera 236a, 236b, etc. of FIG. 2D) that may be selected. The tags may be formatted to facilitate a presentation of one or more icons (e.g., icon 236 of FIG. 2D) on a display device. In some embodiments, the tags applied as part of block 254 may include an indication of one or more microphones that may have been used to record audio associated with the content.

In block 256, the content (as supplemented by any tags that may be applied in block 254) may be transmitted. The transmission may conform to or include a broadcast transmission, a multicast transmission, or a unicast transmission.

In some embodiments, the transmission may serve to stream the (supplemented/tagged) content to one or more user equipment/client devices.

In block 258, a determination may be made whether guidance/direction is enabled. For example, if a user/user equipment selects to disable a guidance feature, flow may proceed from block 258 to block 256 in order to continue transmitting the content as needed. On the other hand, if the guidance feature is enabled, flow may proceed from block 258 to block 260.

In block 260, one or more user/user equipment inputs may be received. For example, the inputs may include one or more of a timeframe/timestamp associated with a playback of the content, a current viewing direction (potentially specified as one or more coordinates), an indication of scenes, objects, or regions that are of interest (or are not of interest), an indication of a currently selected camera or microphone associated with the playback, a specification of a user equipment capability (which may be specified on a user equipment identifier), a determined location (e.g., a past location, a current location, or an anticipated future location) associated with the user equipment, a time or date (a past, present, or future time or date), a user profile, feedback in relation to guidance that is provided, etc.

In block 262, a determination may be made regarding guidance/direction information to provide to the user/user equipment based on the inputs received in block 260. For example, based on the inputs of block 260 indicating a user interest (either express or inferred) in a given portion of the content and a current viewing direction, guidance may be determined in terms of, e.g., a recommended movement (e.g., a pivot, a rotation, etc.) of the user/user equipment to a determined scene, object, or region of interest.

In block 264, the guidance information determined in block 262 may be transmitted to the user/user equipment, potentially as part of a transmission of content. For example, the guidance information may be embedded as part of a transmission of the content (in this respect, aspects of block 256 may be incorporated as part of block 262 and/or block 264). In some embodiments, the guidance information may be transmitted in accordance with one or more formats, such as for example the icons 238 (238a, 238b) of FIGS. 2D-2F, one or more audio instructions, etc. Flow may proceed from block 264 to block 258 to confirm that the guidance feature is still enabled; in this respect, a feedback loop may be established (in conjunction with blocks 258-264) such that pinpoint guidance information customized/tailored to a particular user (or user equipment) may be provided.

Figure 2J:
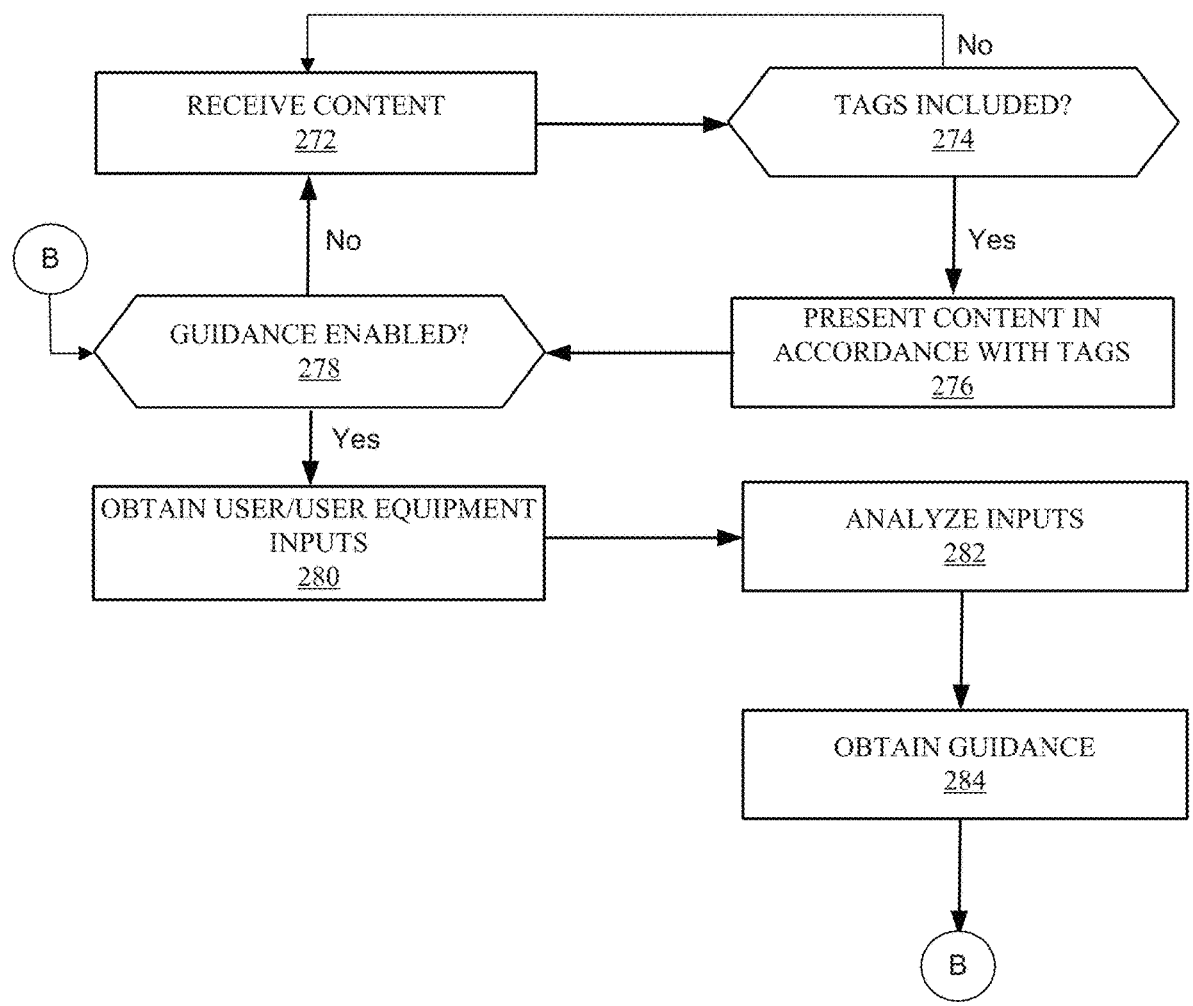

FIG. 2J depicts an illustrative embodiment of a method 270 in accordance with various aspects described herein. The method 270 may be used to present content/media (e.g., 360-degree videos) on a user equipment and may provide guidance information or direction to a user of the user equipment in terms of a consumption (e.g., a viewing) of such content.

In block 272, content may be received. The content may include original content supplemented by, e.g., tags that identify one or more scenes, objects or regions of potential interest.

In block 274, a determination may be made whether tags are included as part of the content received in block 272. If tags are not included, flow may proceed from block 274 to block 272 to continue receiving content as needed. As part of the flow from block 274 to block 272, the content received in block 272 may be presented (e.g., displayed, played, etc.). On the other hand, if tags are included, flow may proceed from block 274 to block 276.

In block 276, the content of block 272 may be presented in accordance with the tags that are included. For example, and referring briefly to FIG. 2D, the jersey 234b may be highlighted as a selectable object in accordance with one or more aspects of this disclosure.

In block 278, a determination may be made whether guidance/direction is enabled. For example, if a user/user equipment selects to disable a guidance feature, flow may proceed from block 278 to block 272 in order to continue receiving the content as needed. On the other hand, if the guidance feature is enabled, flow may proceed from block 278 to block 280.

In block 280, one or more user/user equipment inputs may be received, generated, or obtained. For example, the inputs may include one or more of a timeframe/timestamp associated with a playback of the content, a current viewing direction (potentially specified as one or more coordinates), an indication of scenes, objects, or regions that are of interest (or are not of interest), an indication of a selected camera or microphone associated with the playback, a specification of a user equipment capability (which may be specified on a user equipment identifier), a determined location (e.g., a past location, a current location, or an anticipated future location) associated with the user equipment, a time or date (a past, present, or future time or date), a user profile, feedback in relation to guidance information that is received, etc.

In block 282, the inputs obtained as part of block 280 may be analyzed. As part of block 282, the inputs obtained as part of block 280 may be transmitted to a server, and the server may analyze the inputs to determine and provide guidance information. Alternatively, the user equipment may analyze the inputs as part of block 282 to determine appropriate guidance.

In block 284, guidance information may be obtained. For example, the guidance information may be embedded as part of the content obtained in block 252 (in this respect, aspects of block 252 may be incorporated as part of block 282 and/or block 284). In some embodiments, the guidance information may be received in accordance with one or more formats, such as for example the icons 238 (238a, 238b) of FIGS. 2D-2F, one or more audio instructions, etc. Flow may proceed from block 284 to block 278 to confirm that the guidance feature is still enabled; in this respect, a feedback loop may be established (in conjunction with blocks 278-284) such that pinpoint guidance information customized/tailored to a particular user (or user equipment) may be obtained.

While for purposes of simplicity of explanation, the respective processes are shown and described as a series of blocks in FIG. 2I and FIG. 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In some embodiments, additional blocks not shown may be included. In some embodiments, one or more aspects of the method 250 may be combined with one or more aspects of the method 270.

Aspects of the disclosure may provide one or more non-interruptive and user-friendly interfaces to navigate and guide users to scenes, objects, or regions that they may potentially be interested in when consuming content/media (e.g., 360-degree videos). In accordance with aspects of this disclosure, a user may select a camera/camera angle that captures content (e.g., objects, scenes, etc.) that the user is interested in viewing. The user may then be provided with navigation instructions to enable the user to navigate to locations of a ROI in future FoVs that the user may be interested in viewing and/or hearing.

While some of the example embodiments described herein relate to 360-degree videos, aspects of the disclosure may be applied in connection with content of any type or format. For example, aspects of the disclosure may be adapted for use with panoramic content. Such panoramic content can include 360-degree content, or less than 360-degree content.

Figure 3:
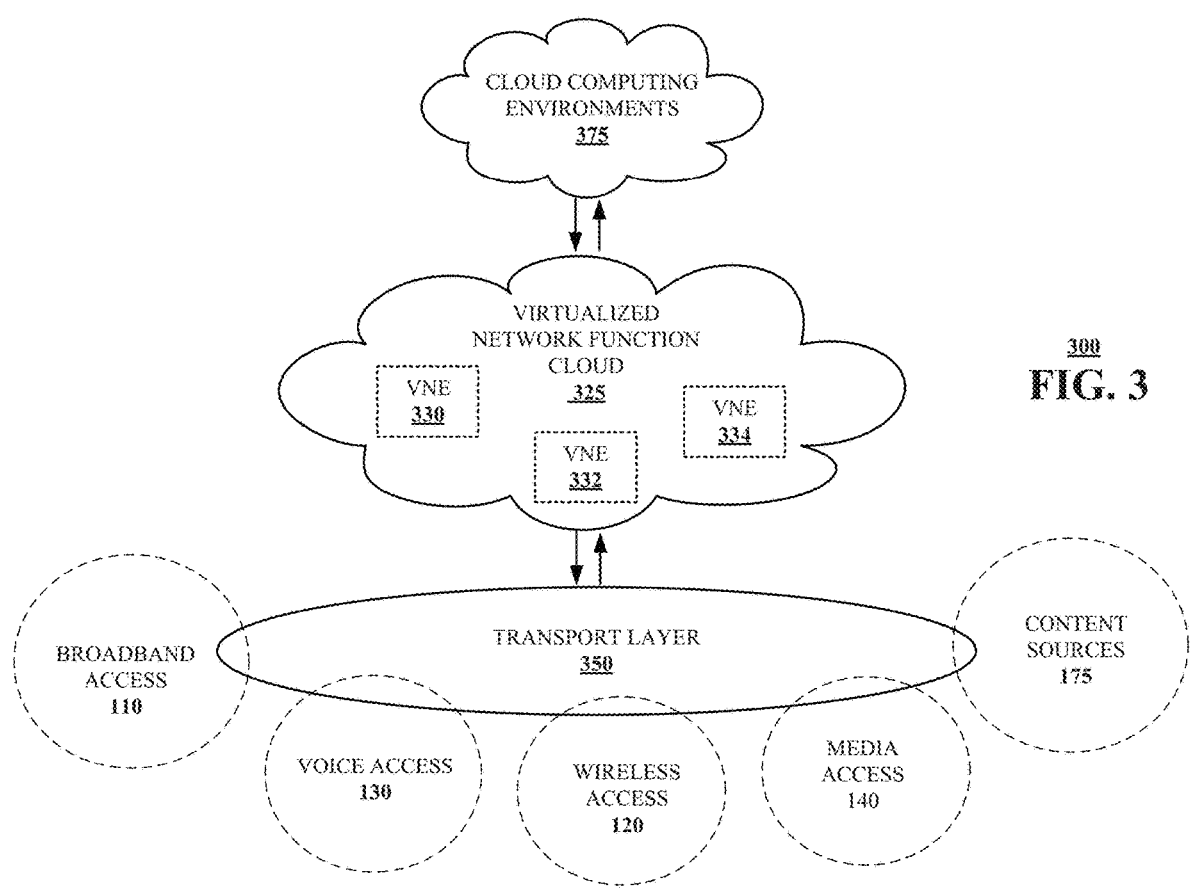
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and the methods 250 and 270 presented in FIGS. 1 and 2A-2J.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
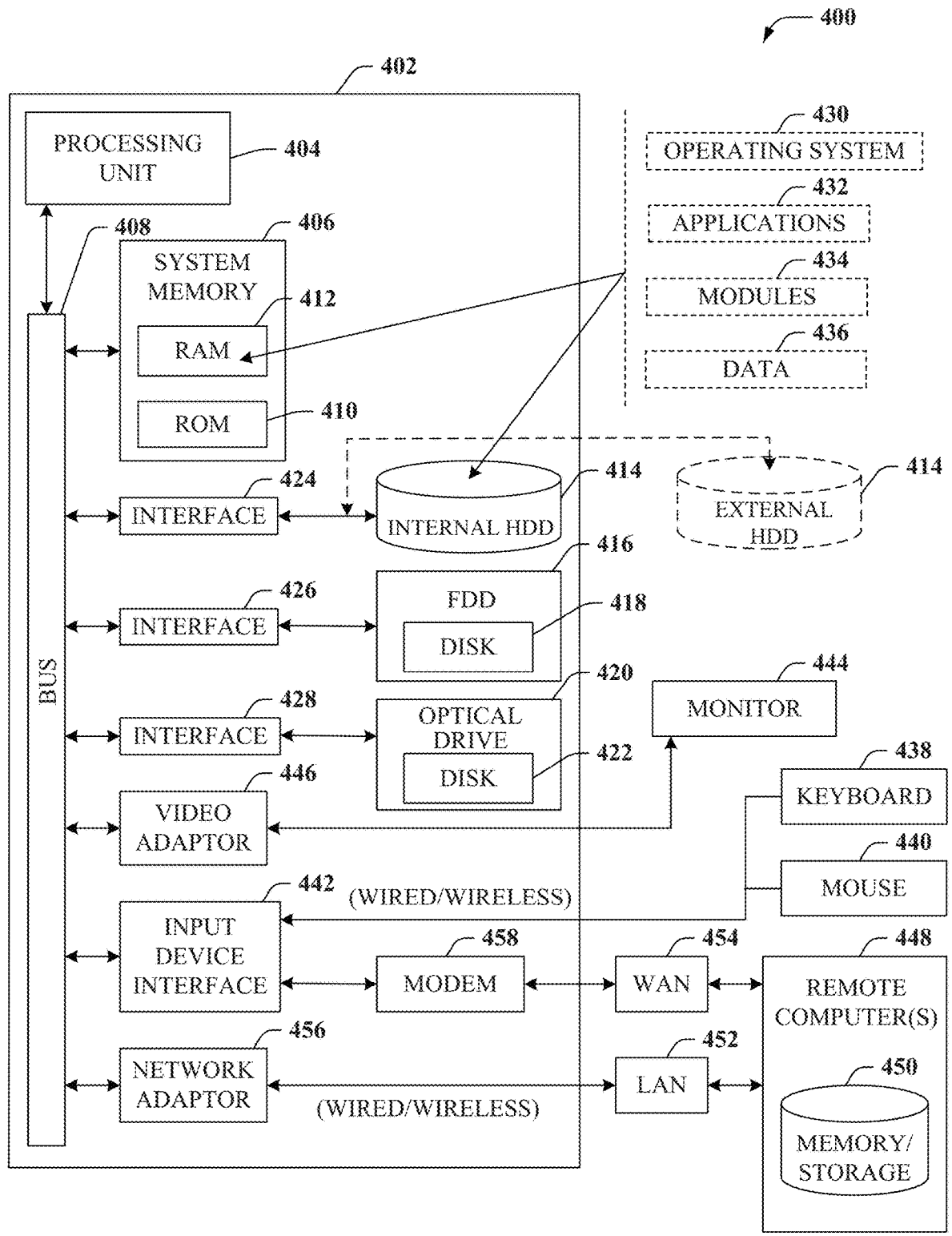
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
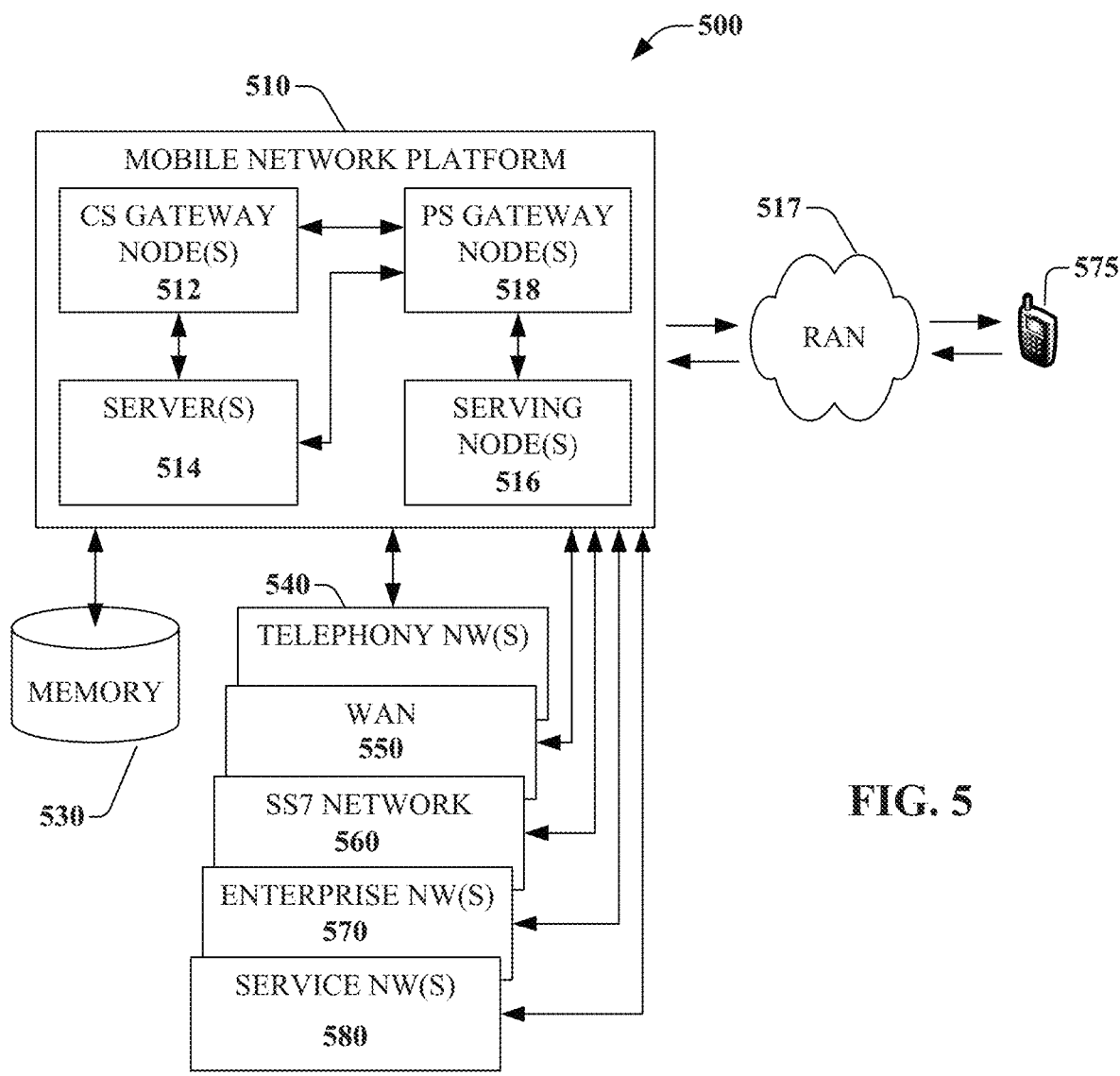
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices 575. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices 575 served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
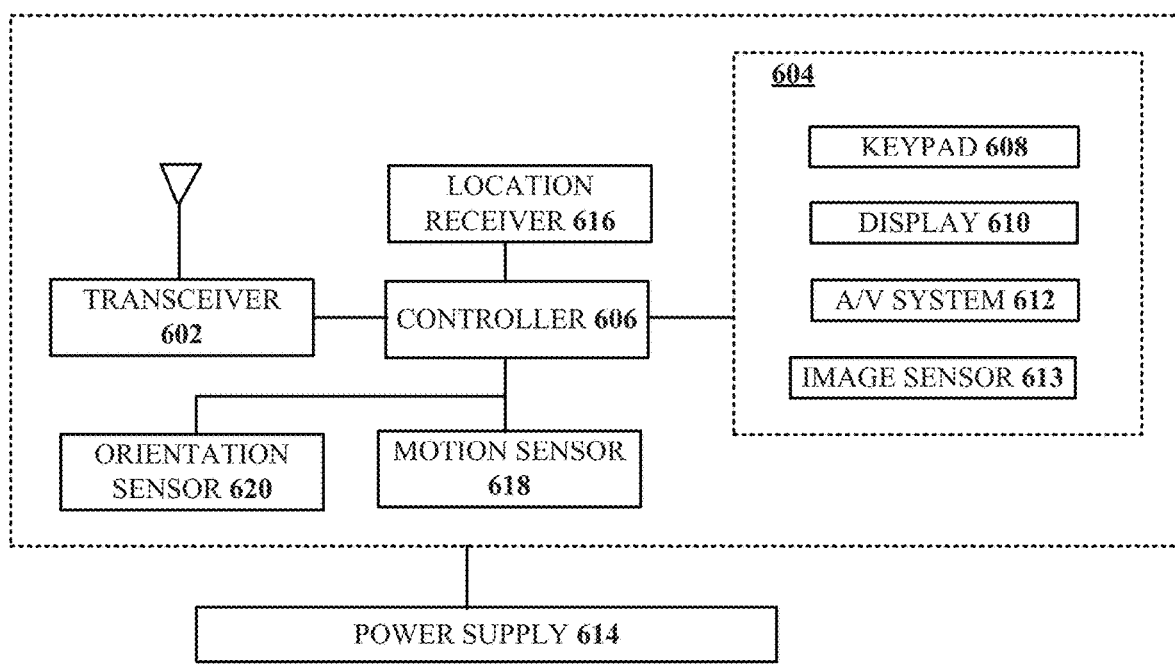
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   receiving content, wherein the content includes a panoramic video;
   determining that a guidance feature is enabled with respect to the content;
   obtaining an input responsive to determining that the guidance feature is enabled; and
   obtaining guidance information with respect to a playback of the content, wherein the guidance information is based on the input,
   wherein the guidance information includes navigation information for enhancing user navigation of the content,
   wherein the input includes user feedback received in response to the playback of the content during a first timeframe of the playback of the content,
   wherein the guidance information is associated with a second timeframe in the playback of the content, and
   wherein the second timeframe is subsequent to the first timeframe in the playback of the content.

2. The device of claim 1, wherein the device includes a headset, a mobile phone, or a tablet.

3. The device of claim 1, wherein the input includes a timestamp associated with the playback of the content.

4. The device of claim 1, wherein the input includes a specification of a current viewing direction.

5. The device of claim 1, wherein the input includes an indication of a scene in the content that is of interest, an object in the content that is of interest, a region in the content that is of interest, or a combination thereof.

6. The device of claim 1, wherein the input includes an indication of a scene in the content that is not of interest, an object in the content that is not of interest, a region in the content that is not of interest, or a combination thereof.

7. The device of claim 1, wherein the input includes an indication of a selected camera, a selected microphone, or a combination thereof, that was used to capture the content.

8. The device of claim 1, wherein the input includes a specification of a capability of the device.

9. The device of claim 1, wherein the operations further comprise:
   determining a location of the device; and
   determining a time and a date,
   wherein the input includes the location, the time, and the date.

10. The device of claim 1, wherein the input includes a user profile associated with a social media platform.

11. The device of claim 1, wherein the operations further comprise:
   identifying an object included in the content as a selectable item;
   receiving a selection of the object subsequent to identifying the object as the selectable item; and
   responsive to receiving the selection of the object, performing at least one of:
     presenting a website that enables an order to be placed for the object;
     presenting a link to the website;
     presenting a preview trailer video clip; or
     presenting a preview audio clip.

12. The device of claim 1, wherein the guidance information includes an identification of a first scene included in the content, a first object included in the content, a first region included in the content, or a combination thereof, and wherein the operations further comprise:
   obtaining second guidance information with respect to the playback of the content,
   wherein the second guidance information is different from the guidance information,
   wherein the second guidance information includes a specification of a reference marker associated with a current viewing direction, and
   wherein the second guidance information includes a specification of a navigation direction and a navigation speed relative to the reference marker to arrive at a second scene included in the content, a second object included in the content, a second region included in the content, or a combination thereof.

13. A non-transitory, machine-readable medium, comprising executable instructions that, when executed by a processing system including a processor, facilitate performance of operations, the operations comprising:
   receiving panoramic content;
   presenting at least a portion of the panoramic content on a display device;
   detecting that the panoramic content includes a guidance feature;
   responsive to the detecting, obtaining a user-generated input to obtain guidance information;

obtaining, according to the user-generated input, the guidance information from the panoramic content; and presenting the guidance information, wherein the guidance information includes navigation information for enhancing user navigation of the panoramic content, wherein the guidance information includes an icon overlaid on top of the portion of the panoramic content, wherein the icon identifies a navigation direction, a navigation speed, or a combination thereof, to arrive at a scene, an object, a region, or a combination thereof, during a playback of the panoramic content, wherein the icon includes an upper marker associated with an upper bound in a current field of view and a lower marker associated with a lower bound in the current field of view, wherein the icon identifies a navigation path to the scene, the object, the region, or the combination thereof, and wherein the navigation path traverses the upper bound, the lower bound, or a combination thereof.

14. The non-transitory, machine-readable medium of claim 13, wherein the icon identifies the navigation direction and the navigation speed.

15. The non-transitory, machine-readable medium of claim 13, wherein the panoramic content includes a tag, wherein the tag identifies a second object included in the panoramic content, and wherein the operations further comprise:

based on the tag, identifying the second object as a selectable item on the display device;

receiving a selection of the second object subsequent to identifying the second object as the selectable item on the display device; and responsive to receiving the selection of the second object, performing at least one of:
presenting a website that enables an order to be placed for the second object;
presenting a link to the website;
presenting a preview trailer video clip; or
presenting a preview audio clip.

16. A method, comprising:

transmitting, by a processing system including a processor, first guidance information associated with a playback of a panoramic video at a user equipment, wherein the first guidance information includes an identification of a first scene included in the video, a first object included in the video, a first region included in the video, or a combination thereof;

receiving, by the processing system, feedback from the user equipment, wherein the feedback is based on the first guidance information; and transmitting, by the processing system, second guidance information associated with the playback of the video at the user equipment in accordance with the feedback, wherein the second guidance information includes an identification of a second scene included in the video, a second object included in the video, a second region included in the video, or a combination thereof, wherein the second guidance information is different from the first guidance information, wherein the second guidance information includes a specification of a reference marker associated with a current viewing direction, and wherein the second guidance information includes a specification of a navigation direction and a navigation speed relative to the reference marker to arrive at the second scene included in the video, the second object included in the video, the second region included in the video, or the combination thereof.

17. The method of claim 16, wherein the feedback includes a selection of a camera, a microphone, or a combination thereof, used to capture at least a portion of the video.

18. The method of claim 16, wherein the video is a 360-degree video, wherein the second guidance information includes an indication of a current field of view, wherein the second guidance information includes an upper marker associated with an upper bound of the current field of view and a lower marker associated with a lower bound of the current field of view, wherein the navigation direction is associated with a navigation path that traverses the upper bound, the lower bound, or a combination thereof, wherein the navigation path is directed to a preview trailer video clip, a preview audio clip, or a combination thereof, and wherein the feedback includes an indication of a movement of a headset of the user equipment.

19. The method of claim 16, wherein the video includes a tag that identifies a third object included in the video as a selectable item, the method further comprising:

receiving, by the processing system, an indication of a selection of the tag at the user equipment; and responsive to receiving the indication of the selection of the tag, performing, by the processing system, at least one of:
providing a website to the user equipment that enables an order to be placed for the third object;
providing a link to the website to the user equipment;
providing a preview trailer video clip to the user equipment; or
providing a preview audio clip to the user equipment.

20. The device of claim 11, wherein the identifying of the object included in the content as the selectable item is in accordance with metadata that is embedded as part of the content.

\* \* \* \* \*